(12) United States Patent
Ishiki et al.

(10) Patent No.: US 7,722,086 B2
(45) Date of Patent: May 25, 2010

(54) FALLING-OFF PREVENTION STRUCTURE FOR CONNECTOR

(75) Inventors: Kazuya Ishiki, Wako (JP); Yukihiro Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/253,656

(22) Filed: Oct. 17, 2008

(65) Prior Publication Data

US 2009/0102188 A1 Apr. 23, 2009

(30) Foreign Application Priority Data

Oct. 18, 2007 (JP) ............................. 2007-271130

(51) Int. Cl.
*F16L 35/00* (2006.01)

(52) U.S. Cl. ............................. 285/81; 285/87; 285/319

(58) Field of Classification Search .................. 285/81, 285/319, 87, 114, 115, 116, 93
See application file for complete search history.

(56) References Cited

U.S. PATENT DOCUMENTS

| | | | |
|---|---|---|---|
| 5,219,188 A * | 6/1993 | Abe et al. | 285/93 |
| 6,343,814 B1 * | 2/2002 | Bucher et al. | 285/319 |
| 6,762,365 B2 * | 7/2004 | Inoue et al. | 174/84 R |
| 6,851,725 B2 * | 2/2005 | Lutzke | 285/305 |
| 6,979,026 B2 * | 12/2005 | Kasahara et al. | 285/93 |
| 7,104,571 B2 * | 9/2006 | Inoue et al. | 285/93 |
| 7,185,922 B2 * | 3/2007 | Takayanagi et al. | 285/319 |
| 7,316,428 B2 * | 1/2008 | Takayanagi et al. | 285/319 |
| 2003/0094813 A1 * | 5/2003 | Bucher et al. | 285/319 |

FOREIGN PATENT DOCUMENTS

JP 6-323483 11/1994

\* cited by examiner

*Primary Examiner*—Aaron M Dunwoody
(74) *Attorney, Agent, or Firm*—Lahive & Cockfield, LLP; Anthony A. Laurentano

(57) ABSTRACT

A falling-off preventing holder is provided to reliably connect a fuel pipe and a connector. First and second flanges project outwardly from an outer peripheral surface of the fuel pipe. The connector includes a larger diameter portion and a smaller diameter portion connected to the larger diameter portion via a step portion. A box-shaped falling-off preventing holder with an open surface is fitted to straddle the fuel pipe and the connector. First cutout of first end wall is fitted on the smaller diameter portion of the connector and abuts the step portion. Second end wall is fitted on the fuel pipe to abut the second flange. A pressure rib provided at the first end wall of the falling-off preventing holder is compressed by the step portion of the connector to be plastically deformed. A load in the connecting direction acting on the fuel pipe and the connector enables reliable connection.

6 Claims, 15 Drawing Sheets

FALLING-OFF PREVENTION STRUCTURE FOR CONNECTOR

BACKGROUND OF THE INVENTION

1. Field of the Invention

The present invention relates to a falling-off prevention structure for a connector, which prevents a connector connected to a pipe member from falling off by using a falling-off preventing holder.

2. Description of the Related Art

The clamp structure which connects a floor fuel tube and a connector so that the floor fuel tube and the connector do not separate from each other when the connector is connected to the metal floor fuel tube and a resin fuel tube is known from the following Japanese Patent Application Laid-open No. 6-323483.

The clamp structure is a box-shaped member with an open surface, and two surfaces opposed to each other that are equipped with U-shaped cutouts respectively. One of the cutouts is fitted on an outer periphery of the floor fuel tube to be locked in an axial direction, and the other cutout is fitted on an outer periphery of the connector to be locked in the axial direction, whereby the floor fuel tube and the connector are connected so as not to separate from each other.

In the structure described in the Japanese Patent Application Laid-open No. 6-323483, out of the two surfaces opposed to each other of the clamp, a tip end portion of the surface, having the cutout which is engaged with the floor fuel tube, is obliquely inclined. By press-fitting the floor fuel tube into the connector through the obliquely inclined surface of the clamp, reliable connection of the floor fuel tube and the connector is designed.

However, by only press-fitting the floor fuel tube into the connector through the obliquely inclined surface of the clamp, it is difficult to achieve a reliable connection, and more reliable connection of the floor fuel tube and the connector is desired.

SUMMARY OF THE INVENTION

In light of the foregoing drawbacks, an object of the present invention is to reliably connect a pipe member and a connector by using a falling-off preventing holder to prevent the pipe member and the connector from separating from each other.

In order to achieve the foregoing object, according to a first feature of the present invention, there is provided a falling-off prevention structure for a connector in which a pipe member and a pipe-shaped connector are connected together. The falling-off prevention structure includes a pipe member having a first flange and a second flange that projects outwardly from an outer peripheral surface of the pipe member. The first flange and the second flange are provided in a vicinity of a tip end portion of the pipe member, in sequence from the tip end portion side of the pipe member. The falling-off prevention structure further includes a pipe-shaped connector comprising a larger diameter portion provided at one end side of the pipe-shaped connector, and a smaller diameter portion provided at another end side of the pipe-shaped connector, wherein the larger diameter portion and the smaller diameter portion are connected via a step portion, wherein the pipe member and the pipe-shaped connector are connected by inserting the first flange in an inner peripheral surface of the larger diameter portion. The falling-off prevention structure also includes a box-shaped falling-off preventing holder placed over the pipe member and the pipe-shaped connector so as to straddle the pipe member and the pipe-shaped connector. The falling-off preventing holder comprises an open surface and a first end wall including a first cutout connecting to the open surface, wherein the first cutout is fitted on the smaller diameter portion and abuts the step portion. The falling-off preventing holder further comprises a second end wall opposed to the first end wall, the second end wall including a second cutout connecting to the open surface, wherein the second cutout is fitted on the pipe member and abuts the second flange. The falling-off preventing holder also comprises a pressure rib provided at the first end wall, wherein the pressure rib is compressed by the step portion of the pipe-shaped connector and hence is plastically deformed.

According to the first feature of the invention, the first cutout of the first end wall is fitted on the smaller diameter portion of the connector to abut the step portion, and the second end wall is fitted on the pipe member to abut the second flange, whereby the pipe member and the connector are fixed so as not to fall off. The pressure rib which is provided at the first end wall of the falling-off preventing holder is compressed by the step portion of the connector to be plastically deformed. Therefore, the load in the connecting direction is caused to act on the pipe member and the connector to enable a more reliable connection.

According to a second feature of the present invention, in addition to the first feature, the falling-off prevention structure further comprises a lid member covering the open surface of the falling-off preventing holder. The lid member is openable and closable, wherein a material of the lid member has a hardness higher than that of a material of the falling-off preventing holder.

With the second feature, the open surface of the falling-off preventing holder is covered with the lid member to be openable and closable, and therefore, the lid member can reliably prevent the falling-off preventing holder from falling off. In addition, the material of the lid member has hardness higher than the material of the falling-off preventing holder, and therefore, even when the falling-off preventing holder is formed of a material with relatively low hardness so that the pressure rib can be plastically deformed, the rigidity of the falling-off preventing holder can be secured with the lid member with high hardness.

According to a third feature of the present invention, in addition to the second feature, the lid member is pivotally supported by the falling-off preventing holder at one side edge. A locking claw provided at the other side edge is capable of engaging with a locked portion provided at the falling-off preventing holder. The lid member is pushed in an opening direction with an elastic force of a press-fitting piece integrally formed at the falling-off preventing holder.

With the third feature, the one side edge of the lid member is pivotally supported by the falling-off preventing holder, and the locking claw provided at the other side edge of the lid member can be engaged with the locked portion provided at the falling-off preventing holder. Therefore, the lid member can be fixed at the closed position by engagement of the locking claw and the locked portion. Further, the lid member is pushed in the opening direction by the elastic force of the press-fitting piece which is integrally formed at the falling-off preventing holder, and therefore, when the falling-off preventing holder is fitted, the lid member automatically opens to enhance operability.

According to a fourth feature of the present invention, in addition to the second or third feature, the rotation preventing rib provided on an inner surface of the lid member is engaged with a rotation preventing recessed portion provided in the connector.

With the fourth feature, the rotation preventing rib provided on an inner surface of the lid member is engaged with a rotation preventing recessed portion provided in the connector, and therefore, even when the rotational force is applied the connector, the connector can be prevented from rotating relative to the falling-off preventing holder and the lid member.

According to a fifth feature of the present invention, in addition to the fourth feature, when torque around an axis of the connector acts on the connector, the rotation preventing rib provided on the inner surface of the lid member ruptures to prevent a damage to the connector.

With the fifth feature, when torque around an axis of the connector acts on the connector, the rotation preventing rib provided on the inner surface of the lid member ruptures. Therefore, a damage to the connector is prevented, and falling-off of the fuel pipe can be prevented.

A fuel pipe 11 of an embodiment corresponds to the pipe member of the present invention, and a window hole 13f of the embodiment corresponds to the rotation preventing recessed portion of the present invention.

Hereinafter, an embodiment of the present invention will be described based on the attached drawings.

BRIEF DESCRIPTION OF THE DRAWINGS

FIG. 1 is a view showing a state in which a falling-off preventing holder is fitted to a fuel pipe and a connector.

FIG. 2 is a view from a direction of arrow 2 in FIG. 1.

FIG. 3 is a sectional view taken along a line 3-3 in FIG. 1.

FIG. 4 is a sectional view taken along a line 4-4 in FIG. 3.

FIG. 5 is a sectional view taken along a line 5-5 in FIG. 1.

FIG. 6 is a sectional view taken along a line 6-6 in FIG. 1.

FIG. 7 is a sectional view taken along a line 7-7 in FIG. 1.

FIG. 8 is a vertical sectional view of the falling-off preventing holder in a state in which a lid member is opened.

FIG. 9 is a view from a direction of an arrow 9 in FIG. 8.

FIG. 10 is a perspective view of the falling-off preventing holder in the state in which the lid member is opened.

FIG. 11 is a side view of a retainer.

FIG. 12 is a view from a direction of an arrow 12 in FIG. 11.

FIG. 13 is a sectional view taken along a line 13-13 in FIG. 11.

FIG. 14 is an operation explanatory view when the connector is connected to the fuel pipe and the retainer.

FIG. 15 is an operation explanatory view when the connector is separated from the fuel pipe and the retainer.

DESCRIPTION OF THE PREFERRED EMBODIMENT

Figure 1:
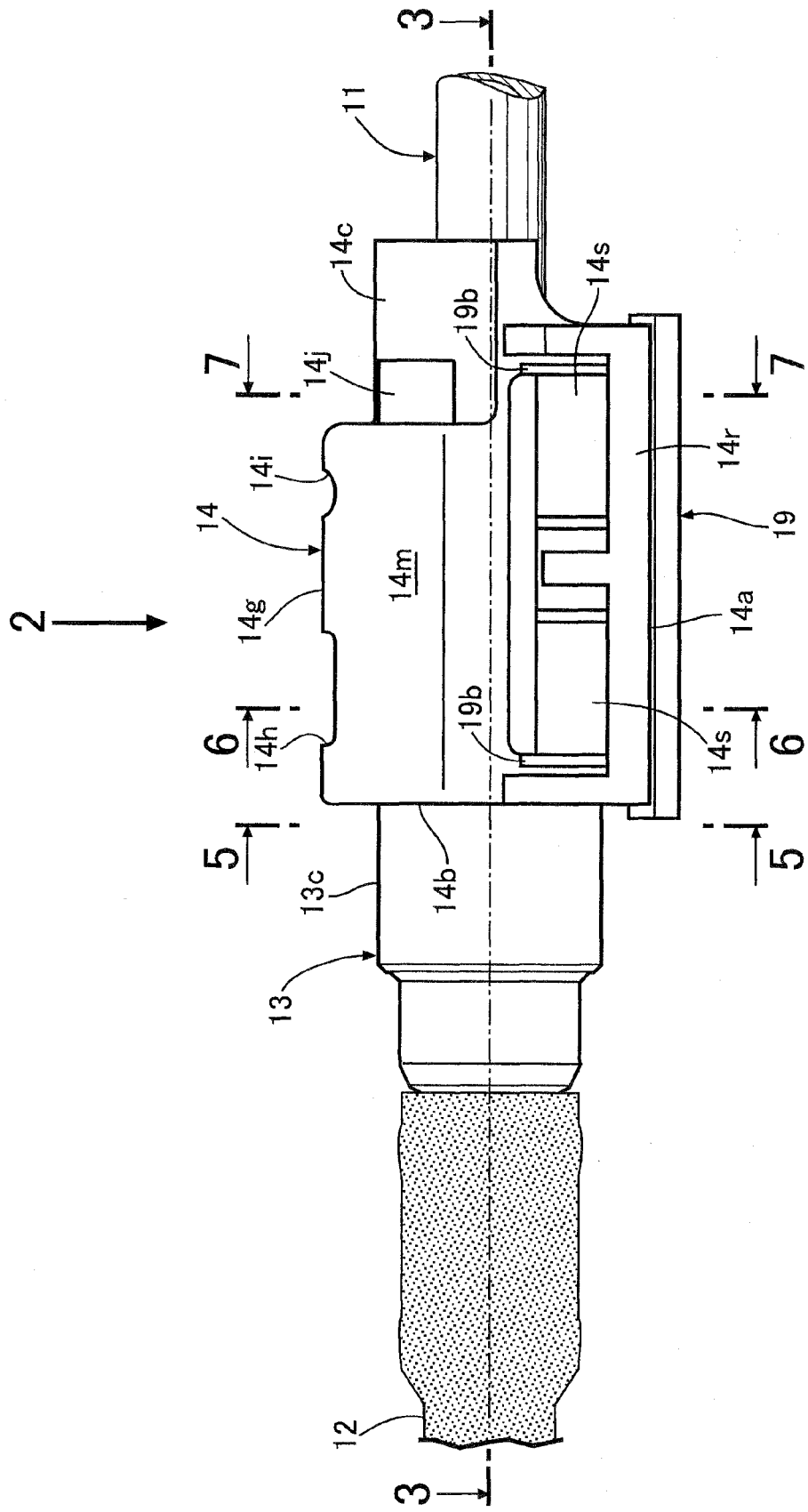
FIGS. 1 to 15 show an embodiment of the present invention.

As shown in FIGS. 1 to 4, when a fuel tube 12 of resin is connected to a fuel pipe 11 of metal provided at an engine side (or a fuel tank side) of an automobile, a connector 13 of resin is fixed to an end portion of the fuel pipe 11 first, and the fuel tube 12 is press-fitted into the connector 13. Since high pressure of fuel acts on the fuel pipe 11 and the fuel tube 12, a falling-off preventing holder 14 of resin is fitted to the fuel pipe 11 and the connector 13 in such a manner as to straddle them so that the connector 13 does not fall off from the fuel pipe 11.

The fuel pipe 11 is basically a pipe having a constant diameter, and an annular first flange 11a and an annular second flange 11b are formed in sequence from its tip end side to project outside in a radial direction.

The connector 13 includes, from its one end side to the other end side, a larger diameter portion 13a with a substantially circular section, a smaller diameter portion 13c with a circular section connected to the larger diameter portion 13a via a step portion 13b, and a fuel tube connecting portion 13d with a smaller diameter connected to the smaller diameter portion 13c. The fuel tube 12 is fitted on an outer periphery of the fuel tube connecting portion 13d. A pair of O-rings 15 and 15 are disposed on an inner peripheral surface of the smaller diameter portion 13c and separated via a spacer 16. A seal member 17 is disposed on an inner peripheral surface of the larger diameter portion 13a in the vicinity of the step portion 13b. The tip end side of the fuel pipe 11 extending beyond the first flange 11a is inserted into the connector 13 from the larger diameter portion 13a side. The tip end side of the fuel pipe 11 is fitted in the inner peripheries of the seal member 17 and the O-rings (15 and 15), and sealed.

Figure 6:
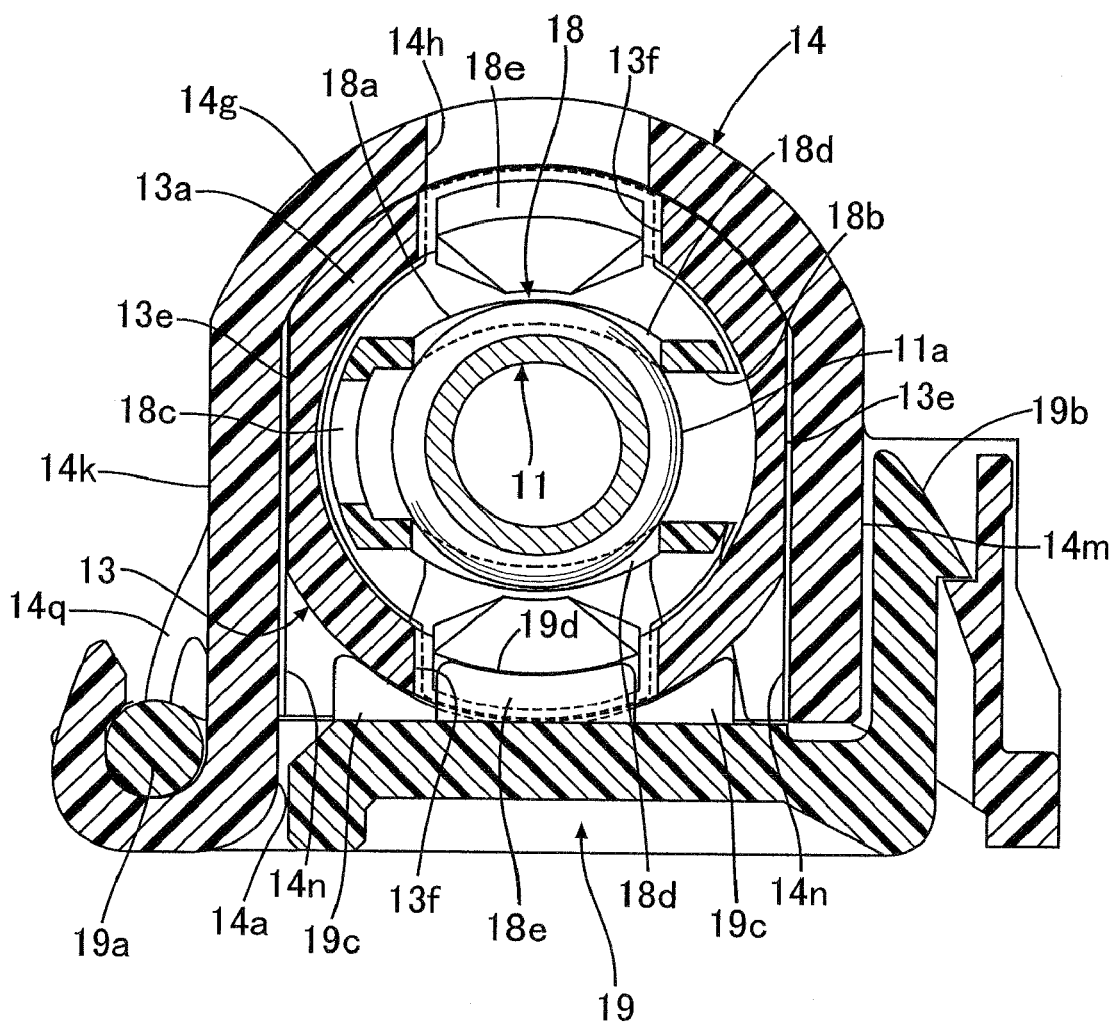

An outer peripheral surface of the larger diameter portion 13a of the connector 13 has a substantially circular section. A pair of flat surfaces 13e and 13e, parallel to each other and extending in the axial direction of the connector 13, are formed by chamfering a part of the circular section (see FIG. 6). A pair of rectangular window holes 13f and 13f are formed at the positions perpendicular to the pair of flat surfaces 13e and 13e, namely, a pair of circular arc surfaces on the outer periphery of the larger diameter portion 13a of the connector 13. A retainer 18 which is constituted of a separate member is disposed inside of the larger diameter portion 13a of the connector 13.

Figure 11:
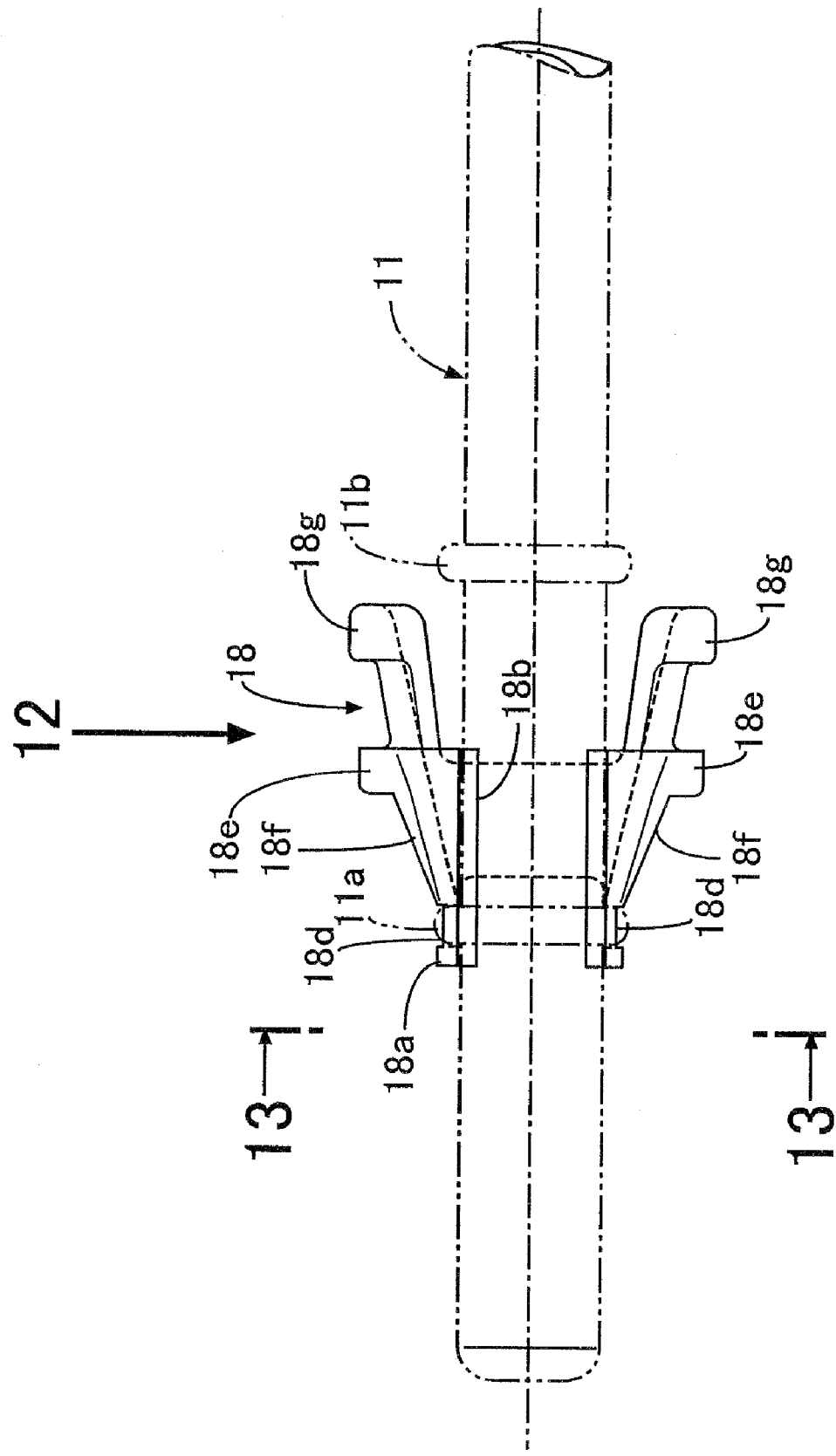
Figure 12:
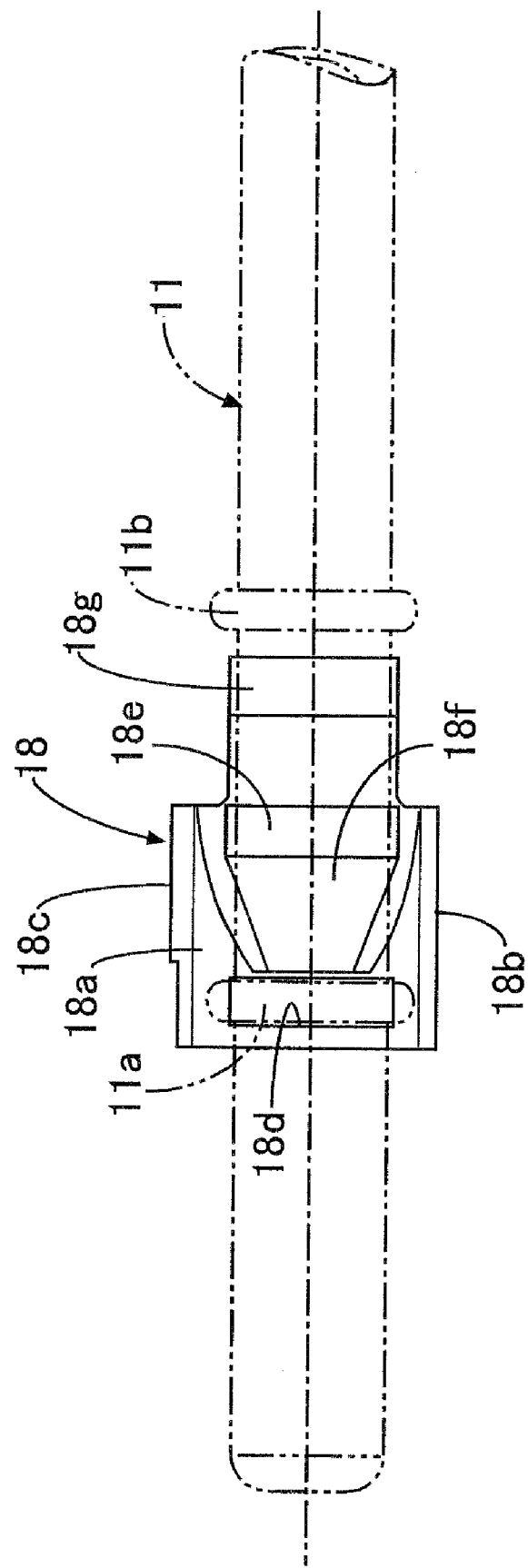
Figure 13:
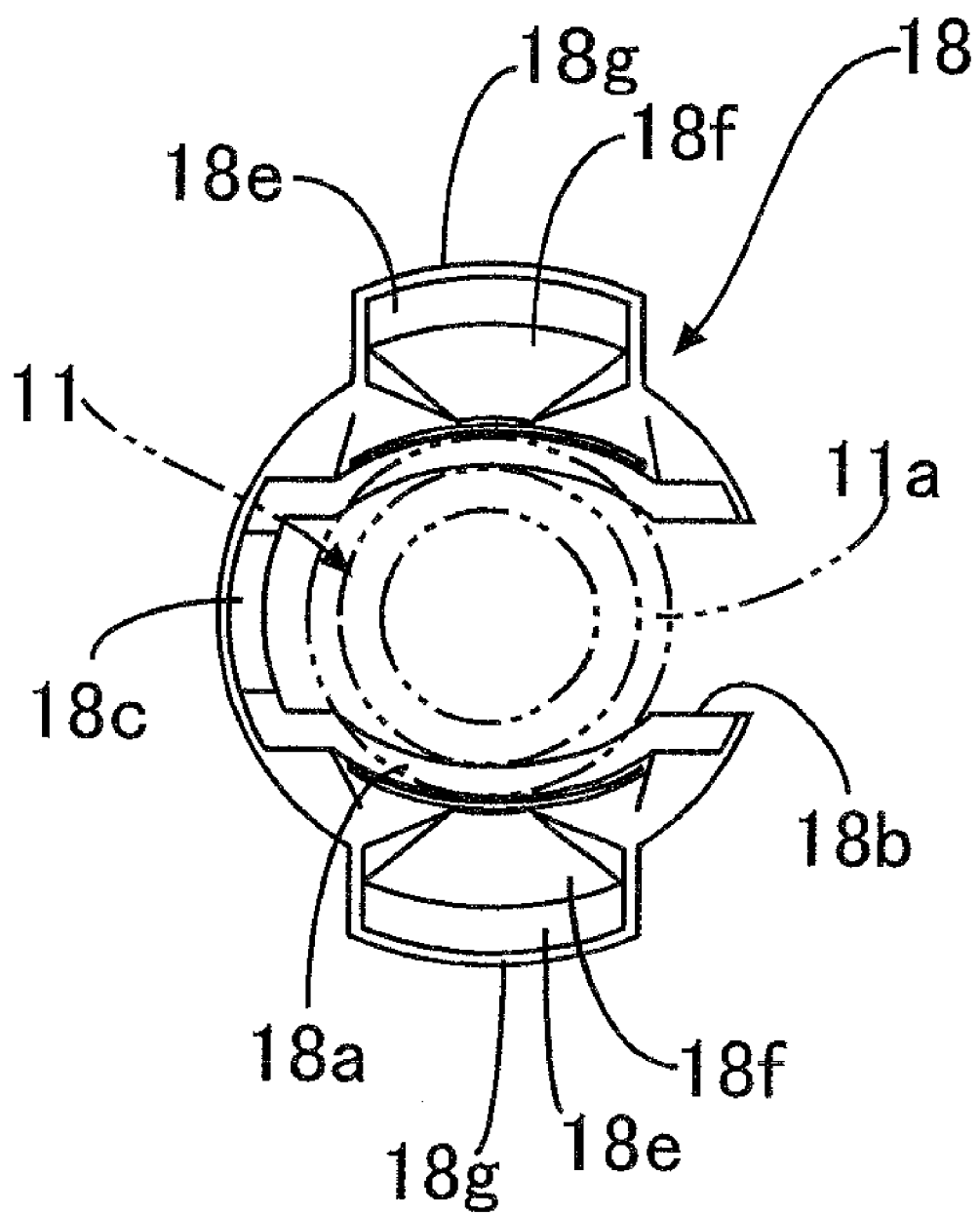

As shown in FIGS. 11 to 13, the retainer 18 includes a cylindrical portion 18a which is fitted on an outer periphery of the fuel pipe 11. A slit 18b extending in the axial direction and a flexible portion 18c which is easily elastically deformable are formed at one side and the other side, respectively, with the axis of the cylindrical portion 18a therebetween (see FIG. 13). A pair of engaging grooves 18d and 18d capable of being engaged with the first flange 11a of the fuel pipe 11 are formed, around a peripheral surface of the cylindrical portion 18, at positions perpendicular to the slit 18b and the flexible portion 18c. A pair of engaging projections 18e and 18e capable of being engaged with the window holes 13f and 13f of the connector 13 project outward in the radial direction via inclined planes 18f and 18f, at positions adjacent to the pair of engaging grooves 18d and 18d of the cylindrical portion 18a. Further, a pair of grip portions 18g and 18g which project outside in the axial direction and outside in the radial direction are formed in the vicinity of the engaging projections 18e and 18e.

Next, a structure of the falling-off preventing holder 14, and a structure of a lid member 19 which is integrally mounted to the falling-off preventing holder 14 will be described based on FIGS. 1 to 10.

Figure 8:
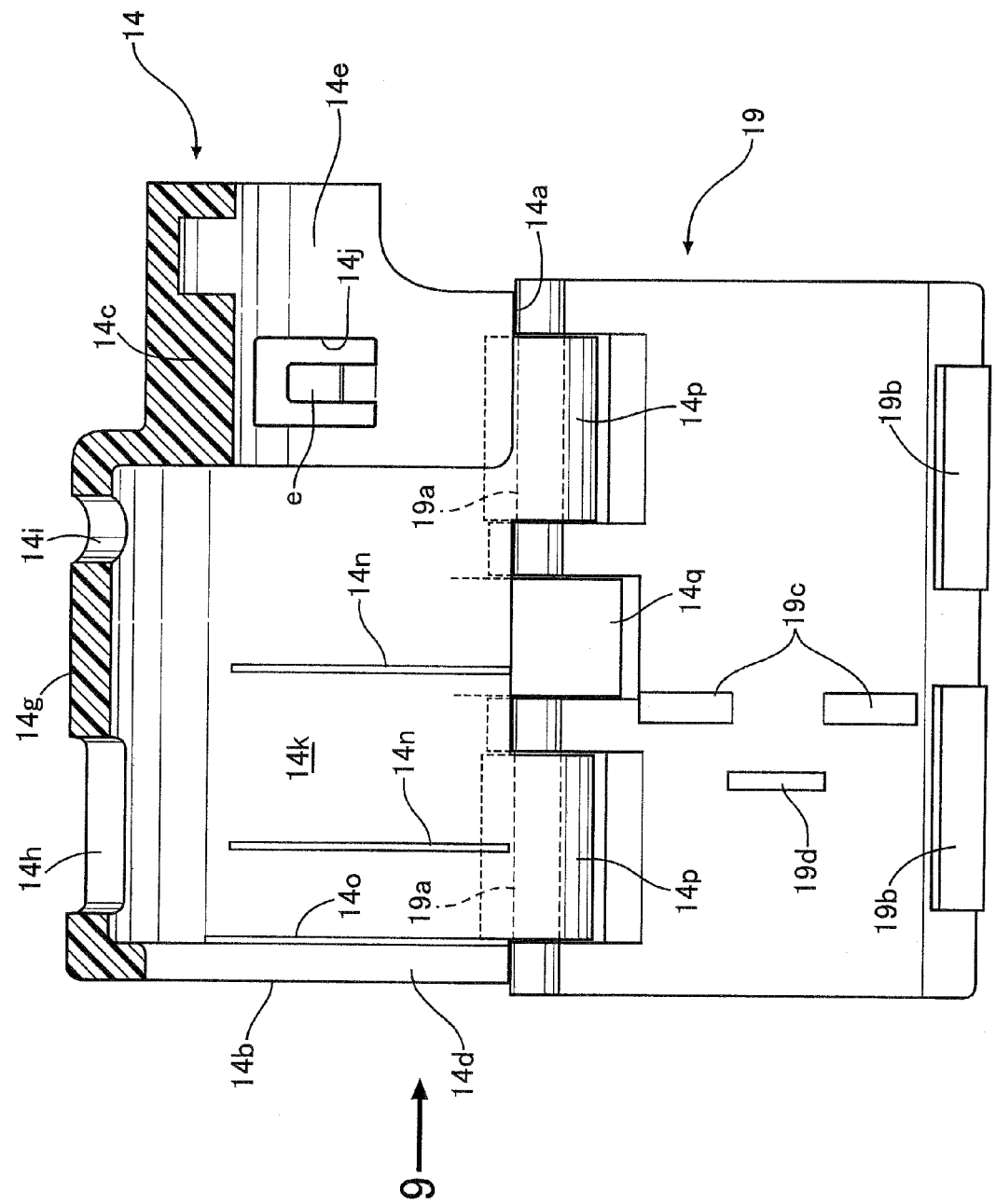
Figure 9:
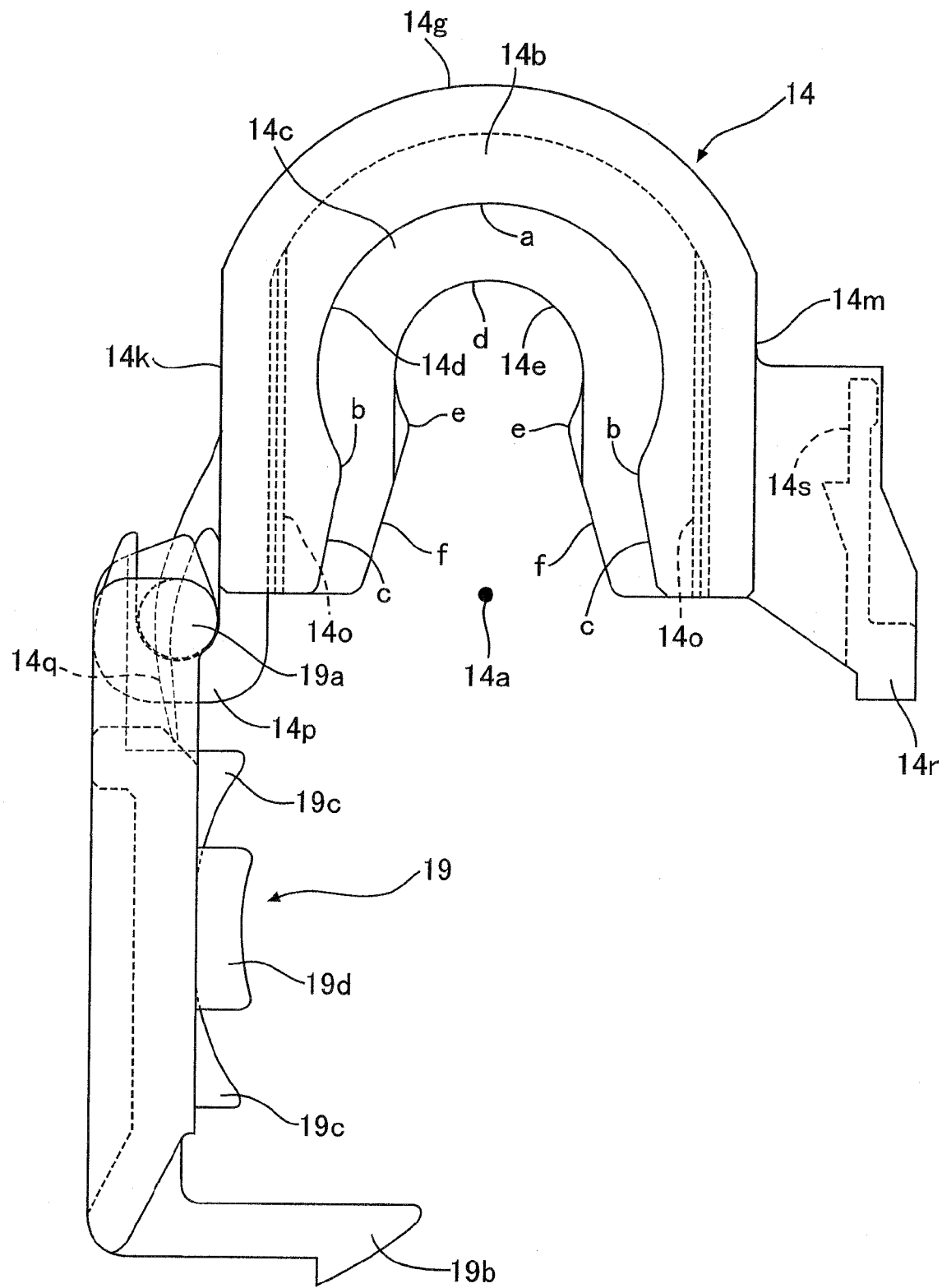
Figure 10:
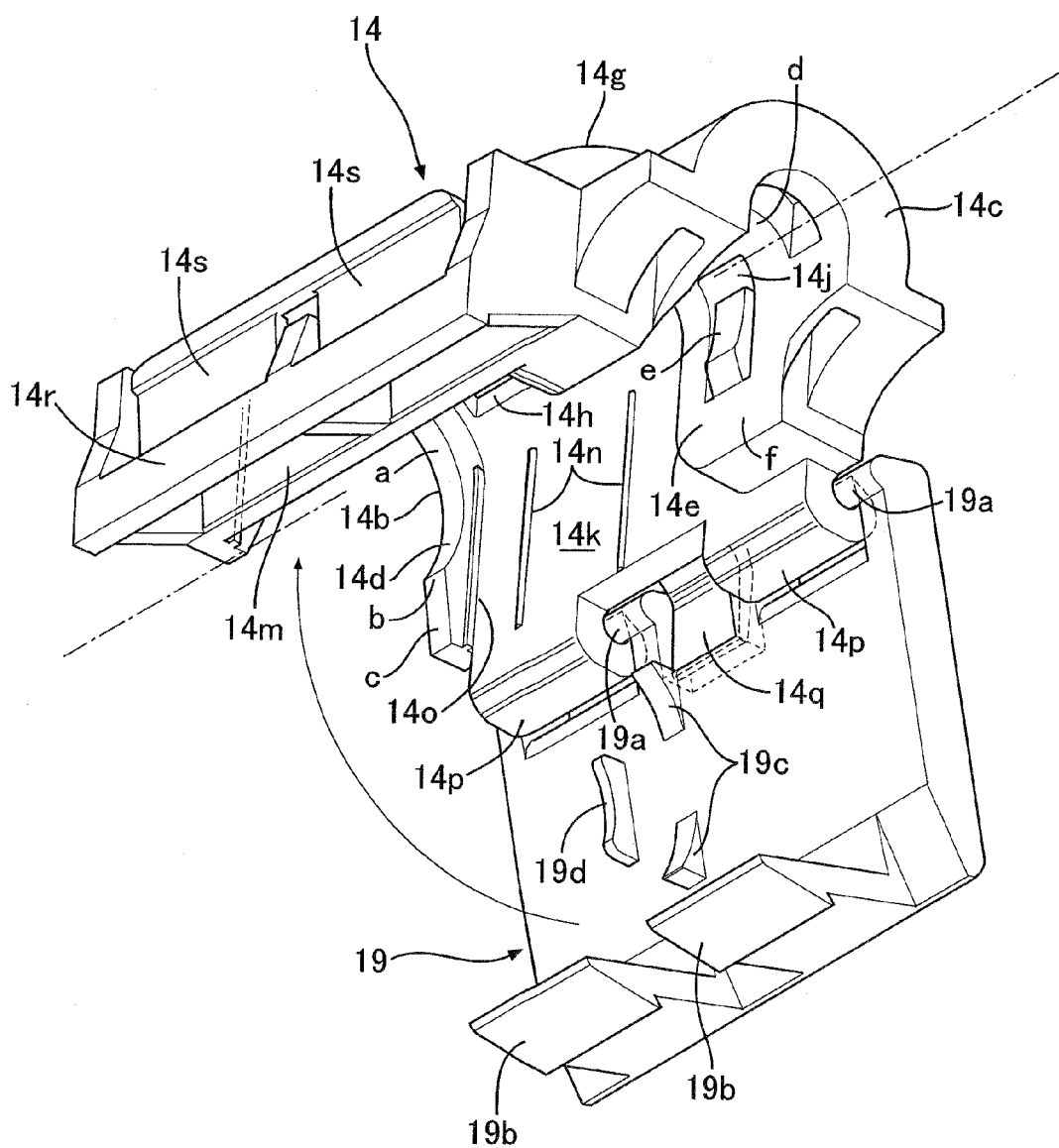

As illustrated in FIGS. 8 to 10, the falling-off preventing holder 14 is a box-shaped member with one surface parallel to the axis of the connector 13 in its fitted state. The falling-off preventing holder 14 comprises an open surface 14a, a first end wall 14b and a second end wall 14c parallel to each other, formed at opposite ends in its axial direction. In the fitted state of the falling-off preventing holder 14, the first end wall 14b which is thin in the axial direction is located at a side close to the fuel tube 12, and the second end wall 14c which is thick in the axial direction is located at a side away from the fuel tube 12.

A substantially U-shaped first cutout 14d which opens to the open surface 14a is formed in the first end wall 14b of the falling-off preventing holder 14. As illustrated in FIG. 9, the first cutout 14d of the first end wall 14b comprises a circular arc portion a which is located at a bottom portion of the first cutout 14d and is in contact with the outer periphery of the smaller diameter portion 13c at an angle exceeding 180°, a pair of throat portions b and b which are located at opposite ends of the circular arc portion a to be opposed to each other, with a space between them set to be slightly smaller than the diameter of the smaller diameter portion 13c, and a pair of guide portions c and c with a space between them extended in a taper shape toward the open surface 14a from the throat portions b and b.

A substantially U-shaped second cutout 14e which opens to the open surface 14a is formed in the second end wall 14c of the falling-off preventing holder 14. The second cutout 14e comprises a circular arc portion d which is located at a bottom portion of the second cutout 14e and is in contact with the outer periphery of the fuel pipe 11 at an angle of 180°, a pair of elastic projection portions e and e which are located at opposite ends of the circular arc portion d to be opposed to each other with a space between them set to be slightly smaller than the diameter of the smaller diameter portion 13c, and a pair of guide portions f and f with a space between them extended in a taper shape toward the open surface 14a from the elastic projection portions e and e.

Figure 2:
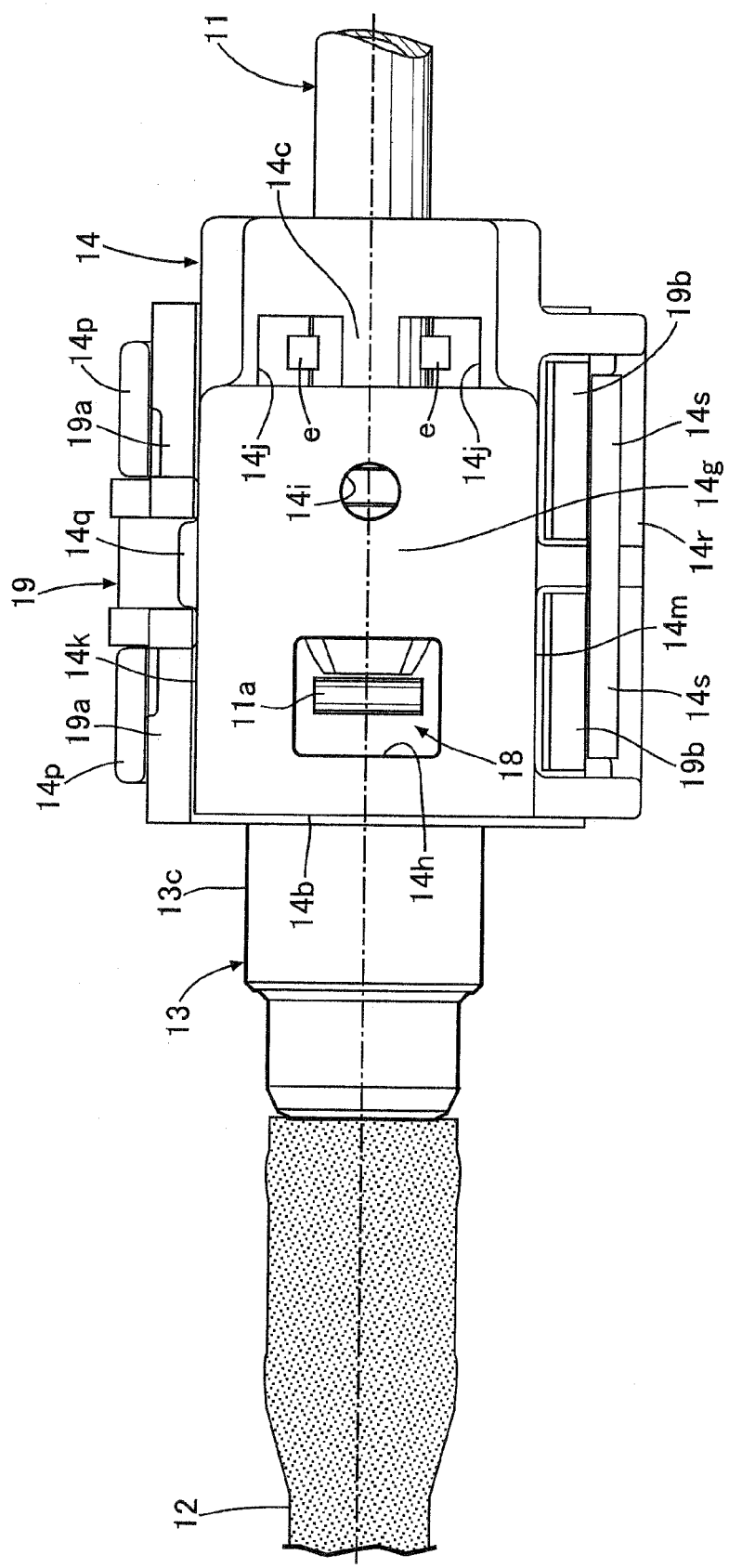
Figure 3:
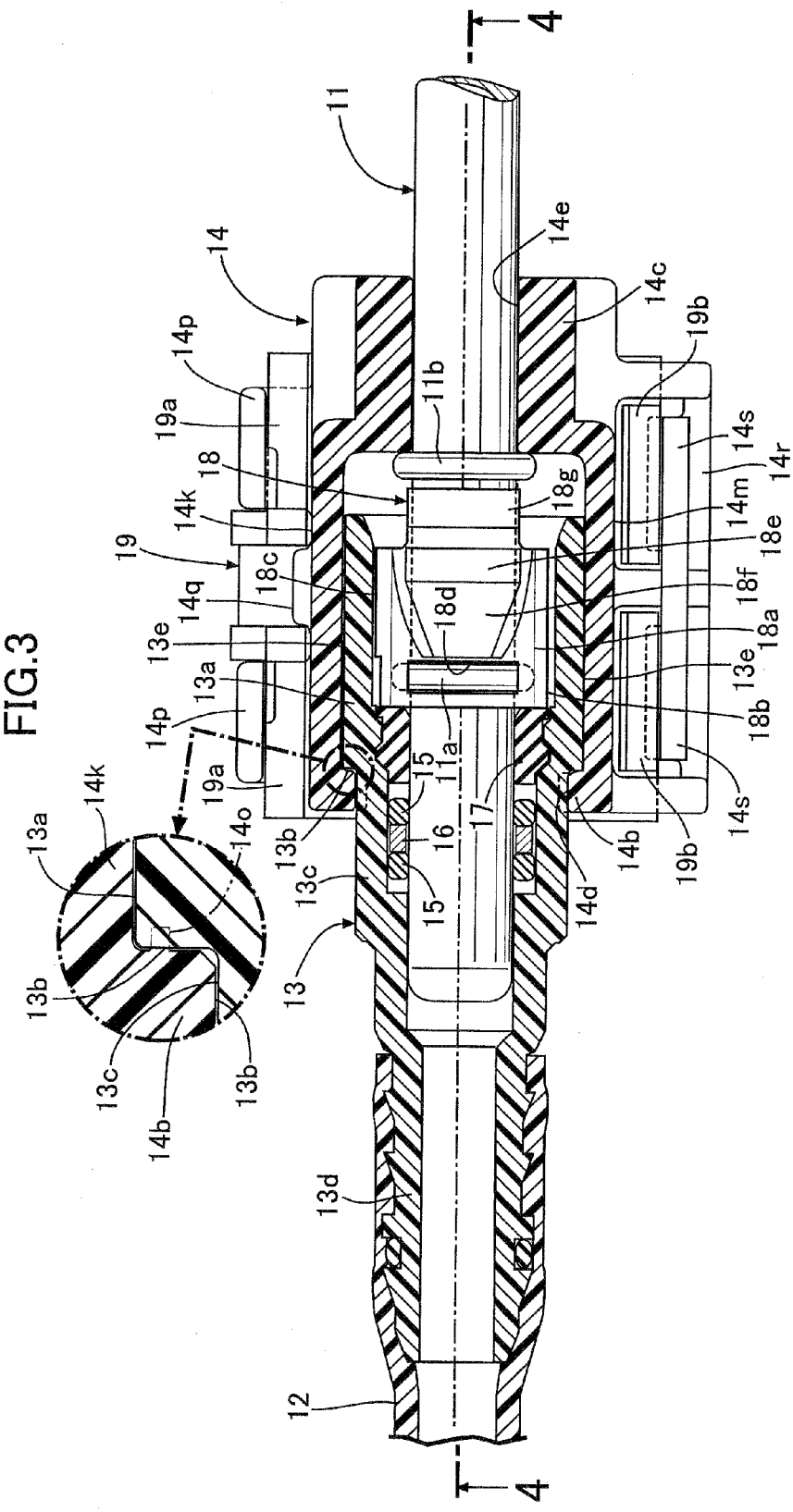
Figure 4:
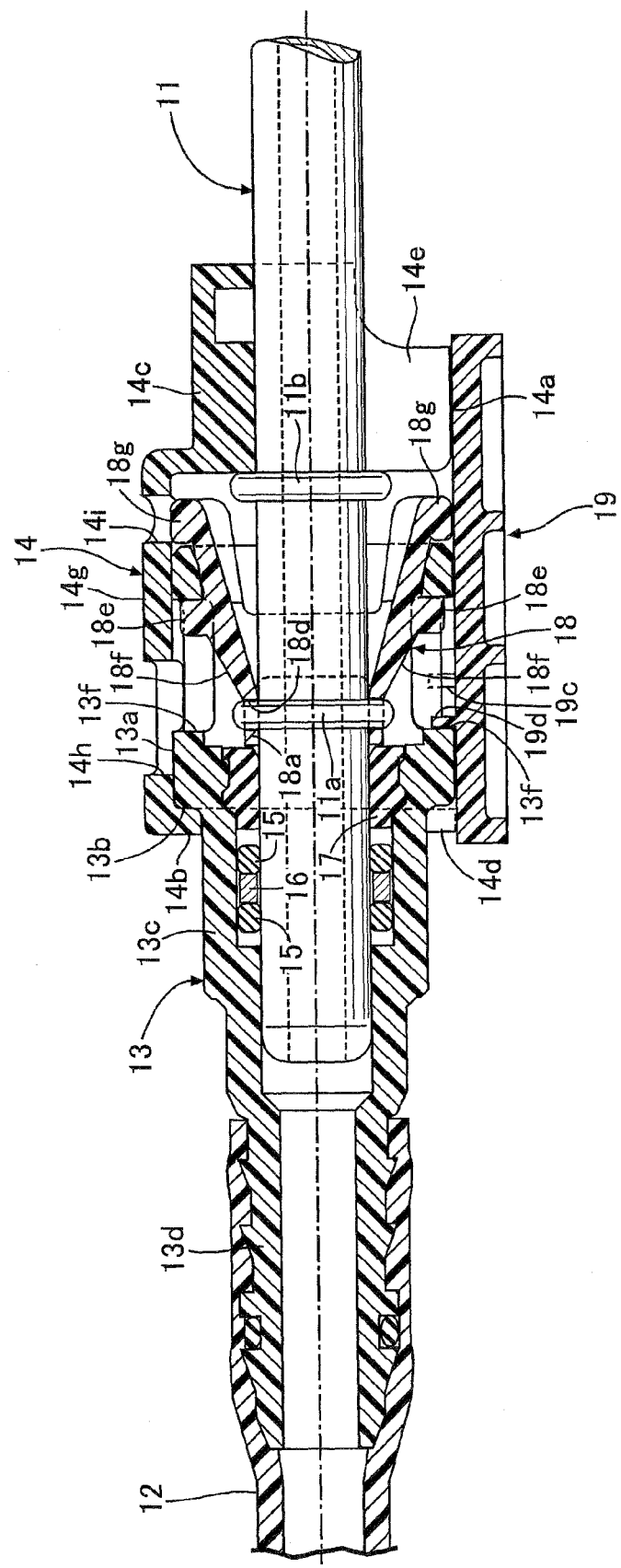

In a U-shaped ceiling wall 14g which is opposed to the open surface 14a of the falling-off preventing holder 14, a rectangular first window hole 14h, a circular second window hole 14i, and rectangular third window holes 14j and 14j, two of which are disposed in parallel, are formed (see FIG. 2). The first window hole 14h is overlaid on one of a pair of the window holes 13f and 13f of the connector 13 (see FIG. 4). A pair of the elastic projection portions e and e faces a pair of the third window holes 14j and 14j.

Two linear support ribs 14n and 14n are formed at an inner surface of each of a pair of parallel side walls 14k and 14m which are connected to the first end wall 14b, the second end wall 14c and the ceiling wall 14g. The support ribs 14n abut on the flat surfaces 13e and 13e of the connector 13 (see FIGS. 6 and 10). Pressure ribs 14o and 14o are formed in the vicinity of portions where the inner surface of the first end wall 14b is connected to a pair of the side walls 14k and 14m (see FIGS. 3, 8 and 10).

A pair of bearing portions 14p and 14p each folded back into a J-shape, and a press-fitting piece 14q in a thin plate shape interposed between the bearing portions 14p and 14p are integrally provided at a portion where one side wall 14k faces the open surface 14a. A frame-shaped portion 14r juts out at a portion where the other side wall 14m faces the open surface 14a. Two locked portions 14s and 14s are extended from the frame-shaped portion 14r, parallel with the side wall 14m.

The lid member 19 has a substantially flat plate shape. Two shaft portions 19a and 19a provided at one side edge of the lid member 19 are rotatably supported by the pair of the bearing portions 14p and 14p. The press-fitting piece 14q which is provided between the pair of the bearing portions 14p and 14p abuts a space between the two shaft portions 19a and 19a of the lid member 19, whereby the lid member 19 is pushed in an opening direction, that is, a direction to open the open surface 14a. Two locking claws 19b and 19b, that are capable of engaging with the locked portions 14s and 14s, project outwardly at the other side edge of the lid member 19.

Support ribs 19c and 19c are provided on a flat inner surface of the lid member 19. Support ribs 19c and 19c abut the surface in the circular arc shape of the larger diameter portion 13a of the connector 13. A rotation preventing rib 19d fitted in one of a pair of the window holes 13f and 13f of the connector 13 is provided.

The falling-off preventing holder 14 and the lid member 19 are both made of synthetic resins. The material of the lid member 19 is a material with a hardness higher than the material of the falling-off preventing holder 14.

Next, an operation of the embodiment of the present invention including the above described configuration will be described.

Figure 14:
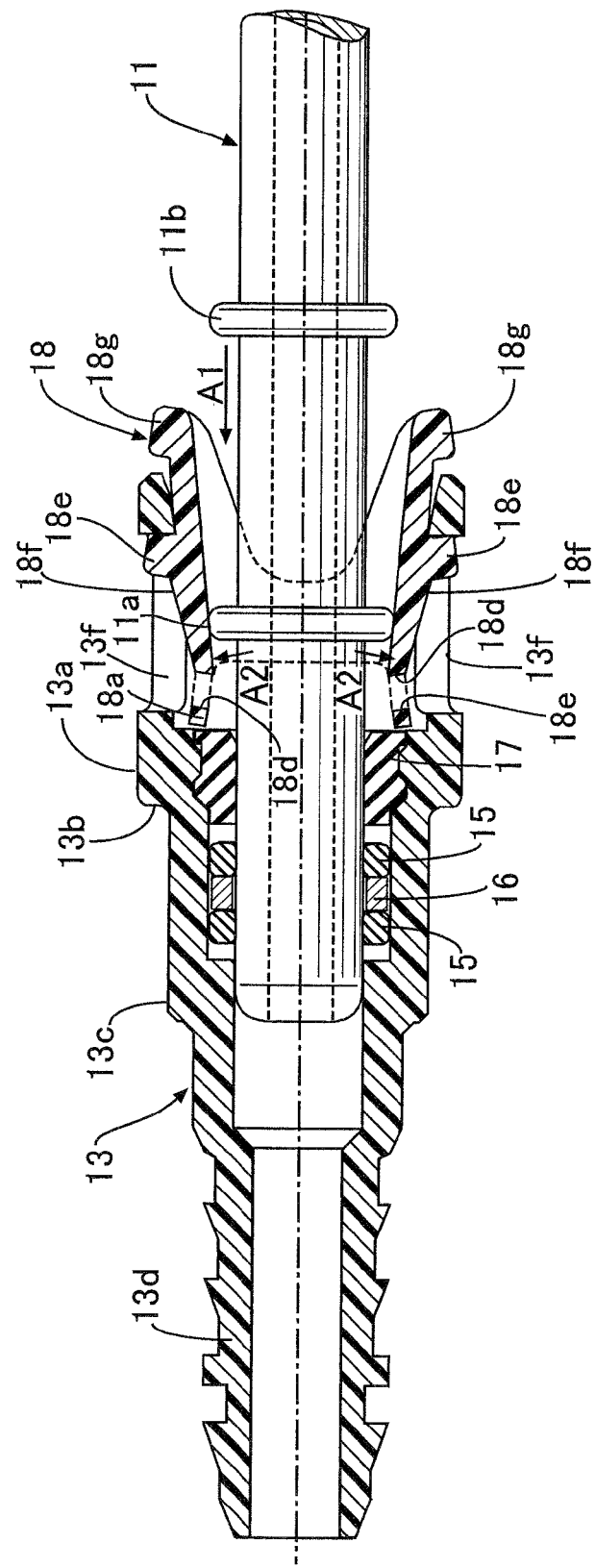

In order to connect the connector 13 to the fuel pipe 11, the retainer 18 is inserted in the direction of arrow A1 from the opening of the larger diameter portion 13a of the connector 13. First as shown in FIG. 14, the inclined surfaces 18f and 18f of the retainer 18 are caused to abut the opening of the larger diameter portion 13a of the connector 13 and are elastically deformed inward in the radial direction, whereby the engaging projections 18e and 18e are engaged with the window holes 13f and 13f of the connector 13. Subsequently, the fuel pipe 11 is inserted in the retainer 18, whereby the first flange 11a forcefully opens the cylindrical portion 18a of the retainer 18 in the direction of the arrow A2, and engaged with a pair of the engaging grooves 18d and 18d. Thereby, the retainer 18 is fitted in the connector 13.

Figure 15:
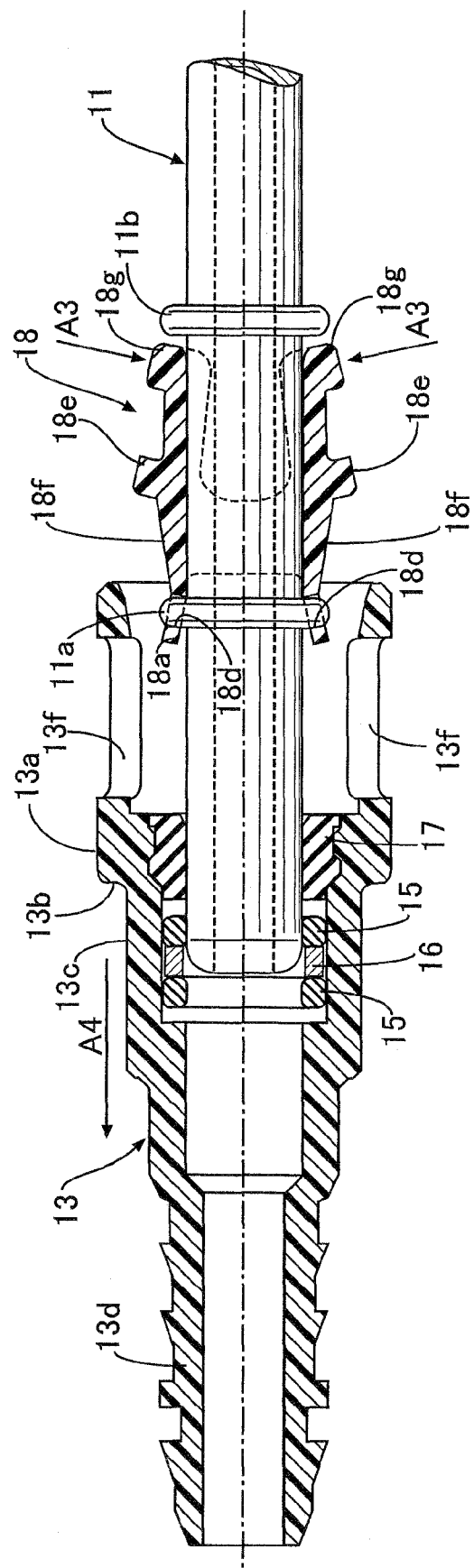

In order to separate the fuel pipe 11 from the connector 13, a pair of the grip portions 18g and 18g of the retainer 18 are elastically deformed in a direction to be close to each other (see the arrow A3) as shown in FIG. 15. The engaging projections 18e and 18e are brought close to each other to release engagement with the window holes 13f and 13f of the connector 13, and the connector 13 is extracted in the direction of the arrow A4 in this state. Thereby, the connector 13 can be separated from the fuel pipe 11. The retainer 18 remaining at the fuel pipe 11 side can be separated from the fuel pipe 11 by elastically deforming the flexible portion 18c and opening the slit 18b.

The falling-off preventing holder 14 is fitted in such a manner as to straddle the connector 13 and the fuel pipe 11 in order to prevent unintentional separation of the fuel pipe 11 and the connector 13.

Figure 5:
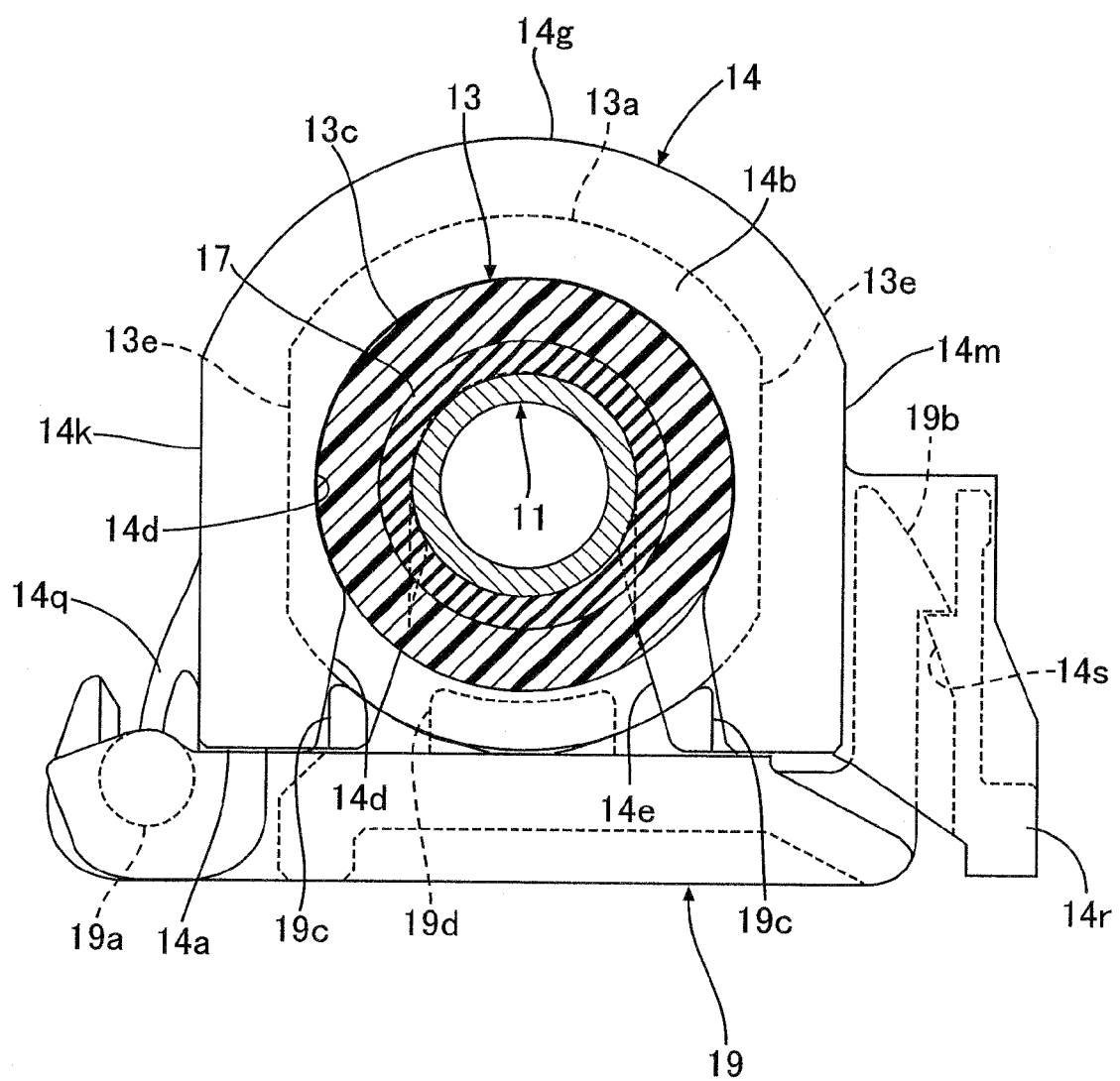
Figure 7:
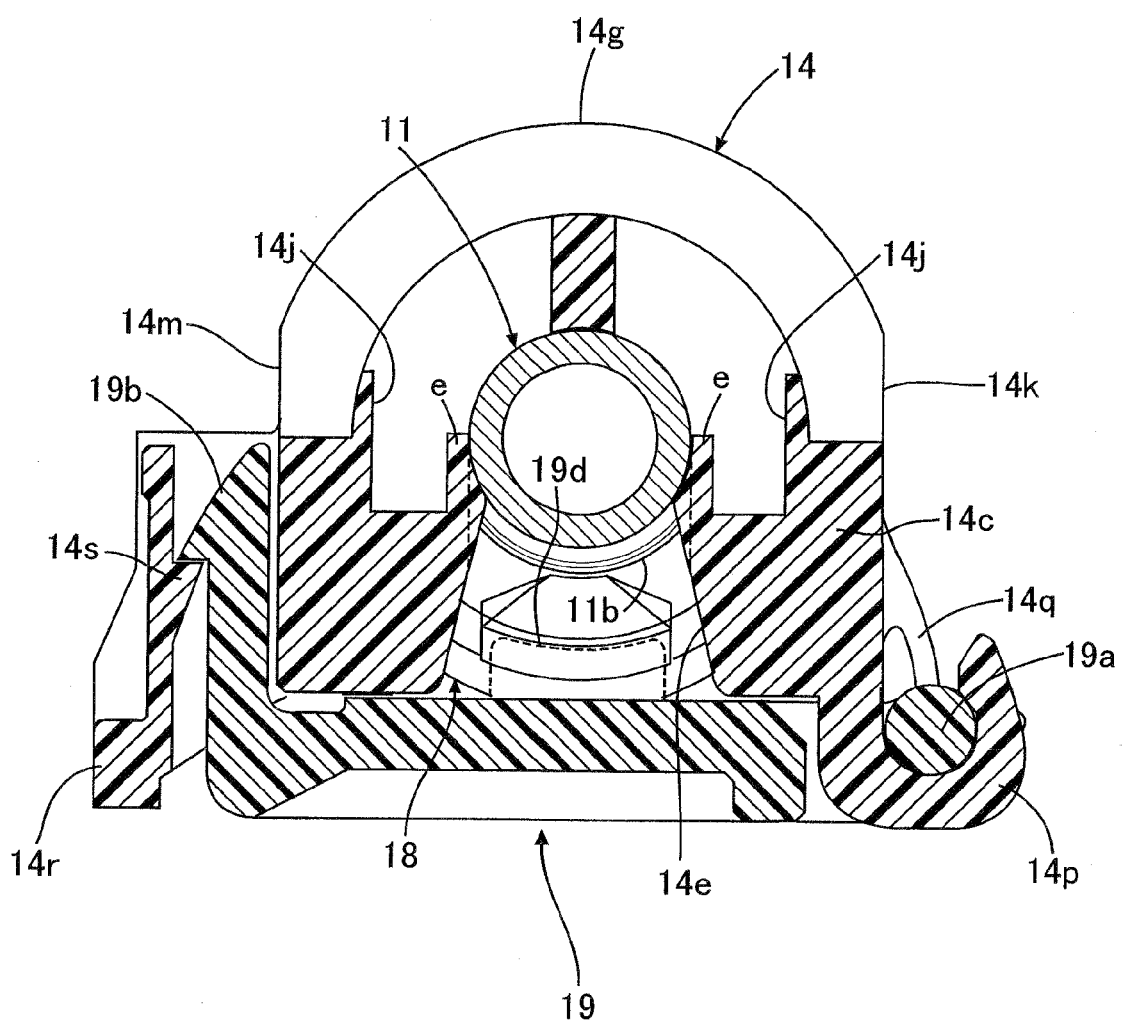

First, as shown in FIG. 9, the lid member 19 is opened with respect to the open surface 14a of the falling-off preventing holder 14. At this time, the lid member 19 automatically opens by the elastic force of the press-fitting piece 14q of the falling-off preventing holder 14, and therefore, operability is enhanced. Subsequently, when a pair of the flat surfaces 13e and 13e of the connector 13 (see FIG. 6) are positioned to be parallel to the pair of the side walls 14k and 14m of the falling-off preventing holder 14, the fuel pipe 11 and the connector 13, which are integrated via the retainer 18, are inserted from the open surface 14a of the falling-off preventing holder 14. As a result, as shown in FIG. 5, the first cutout 14d which is formed in the first end wall 14b of the falling-off preventing holder 14 is fitted on the outer peripheral surface of the smaller diameter portion 13c of the connector 13. In addition, as shown in FIG. 7, the second cutout 14e which is formed in the second end wall 14c of the falling-off preventing holder 14 is fitted on the outer peripheral surface of the fuel pipe 11.

Since the throat portions b and b each with a width slightly smaller than the outside diameter of the smaller diameter portion 13c of the connector 13, are formed at the first cutout 14d of the first end wall 14b, the falling-off preventing holder 14 is elastically deformed in such a manner as to be forcefully extended by the smaller diameter portion 13c which is guided by the taper guide portions c and c. The throat portions b and b are opened, and thereafter, are closed again, whereby the smaller diameter portion 13c is snap-fitted to the circular arc portion a of the first cutout 14d with a snap sound, and is locked by the throat portions b and b so as not to fall off from the first cutout 14d.

Similarly, since the elastic projection portions e and e, which are slightly smaller in width than the outside diameter of the fuel pipe 11, are formed in the second cutout 14e of the second end wall 14c, the elastic projection portions e and e are elastically deformed in such a manner as to be forcefully extended by the fuel tube 12 which is guided by the guide portions f and f each in the taper shape. The guide portions f and f are opened, and thereafter are closed again, whereby the fuel pipe 11 is snap-fitted to the circular arc portion d of the second cutout 14e with a snap sound, and are locked by the elastic projection portions e and e so as not to fall off from the second cutout 14e. By the two snap sounds, an operator can confirm that the falling-off preventing holder 14 is reliably fitted.

When the falling-off preventing holder 14 is thus fitted, the first end wall 14b abuts the step portion 13b of the connector 13, and the inner surface of the second end wall 14c abuts the second flange 11b of the fuel pipe 11. The step portions 13b and the second flange 11b are sandwiched from opposite sides in the axial direction to be able to prevent separation of both of them reliably. Further, when the falling-off preventing holder 14 is fitted, the step portion 13b of the connector 13 advances while plastically deforming the pressure ribs 14o and 14o (see FIGS. 3, 8 and 10) formed on the inner surface of the first end wall 14b of the falling-off preventing holder 14. A load which brings the connector 13 and the fuel pipe 11 close to each other is generated to make the connection of both of them more reliable, and separation of the fuel pipe 11 and the connector 13 can be reliably prevented.

Subsequently, the lid member 19 is turned around the shaft portions 19a and 19a, and a pair of locking claws 19b and 19b are snap-fitted to the locked portions 14s and 14s of the falling-off preventing holder 14. By closing the open surface 14a of the falling-off preventing holder 14 with the lid member 19, the falling-off preventing holder 14 becomes incapable of falling off from the fuel pipe 11 and the connector 13. Thereby, the fuel pipe 11 and the connector 13 are prevented from separating from each other.

Further, the support ribs 14n and 14n provided in the pair of the side walls 14k and 14m of the falling-off preventing holder 14 abut the pair of the flat surfaces 13e and 13e of the connector 13. The pair of support ribs 19c and 19c provided on the inner surface of the lid member 19 abut the circular arc surface of the connector 13. The rotation preventing rib 19d provided on the inner surface of the lid member 19 is engaged with one of the two window holes 13f and 13f of the connector 13. The falling-off preventing holder 14 and the lid member 19 become incapable of rotating relatively to the connector 13 (see FIG. 6).

The synthetic resin constituting the falling-off preventing holder 14 has a relatively low hardness, and the synthetic resin constituting the lid member 19 has a relatively high hardness. Accordingly, at the time of fitting the falling-off preventing holder 14, the pressure ribs 14o and 14o can be plastically deformed with a proper load. The rigidity of the locking claws 19b and 19b of the lid member 19 is secured while the locked portions 14s and 14s of the falling-off preventing holder 14 are made capable of being easily and elastically deformed. The locking claws 19b and 19b and the locked portions 14s and 14s can be reliably engaged with each other with favorable feeling.

When the falling-off preventing holder 14 is fitted and the lid member 19 is closed, the connecting state of the fuel pipe 11, the connector 13 and the retainer 18 can be visually confirmed from outside through the first to third window holes 14h, 14i, 14j and 14j provided in the falling-off preventing holder 14 and the window hole 13f provided in the connector 13. In addition, the rigidity of the falling-off preventing holder 14 is enhanced by the lid member 19.

When a rotational force acts on the connector 13 due to application of a tensile load to the fuel tube 12, for example at a time of collision or the like of the vehicle, the connector 13 is prevented from rotating relative to the falling-off preventing holder 14 and the lid member 19 because the rotation preventing rib 19d of the rid member 19 is engaged with the window hole 13f of the connector 13. However, when the rotational force exceeds a predetermined value, the rotation preventing rib 19d of the lid member 19 ruptures, and thereby, the connector 13 can relatively rotate while elastically deforming the falling-off preventing holder 14 and the lid member 19 slightly. Thereby, the connector 13 is prevented from being damaged by the rotational force, and separation of the fuel pipe 11 and the connector 13 can be reliably prevented.

The embodiment of the present invention is described above, but various design changes can be made in the range without departing from the gist of the present invention.

For example, in the embodiment, the fuel pipe 11 is shown as an example as the pipe member, but the pipe member of the present invention is not limited to the fuel pipe 11.

Further, in the embodiment, the height of the pressure rib 14o is formed to be constant. However, it is possible to make the height of the pressure rib 14o smaller at the side of the open surface 14a of the falling-off preventing holder 14 where the connector 13 is inserted from, and higher in a taper shape where the pressure rib 14o is closer to the ceiling wall 14g, to make the fitting operation of the falling-off preventing holder 14 easier.

What is claimed is:

1. A falling-off prevention structure for a connector in which a pipe member and a pipe-shaped connector are connected together, the falling-off prevention structure comprising:
   a pipe member having a first flange and a second flange that project outwardly from an outer peripheral surface of the pipe member, wherein the first flange and the second flange are provided in a vicinity of a tip end portion of the pipe member, in sequence from the tip end portion side of the pipe member;
   a pipe-shaped connector comprising a larger diameter portion provided at one end side of the pipe-shaped connector, and a smaller diameter portion provided at another end side of the pipe-shaped connector, wherein the larger diameter portion and the smaller diameter portion are connected via a step portion, wherein the pipe member and the pipe-shaped connector are connected by inserting the first flange in an inner peripheral surface of the larger diameter portion; and
   a box-shaped falling-off preventing holder placed over the pipe member and the pipe-shaped connector so as to straddle the pipe member and the pipe-shaped connector, the falling-off preventing holder comprising:
      an open surface,
      a first end wall and a second end wall which are opposed to axial opposite ends of the pipe-shaped connector in a state where the falling-off preventing holder is placed over the pipe-shaped connector,
      the first end wall including a first cutout connecting to the open surface, wherein the first cutout is fitted on the smaller diameter portion and abuts the step portion, the second end wall including a second cutout connecting to the open surface, wherein the second cutout is fitted on the pipe member and abuts the second flange, and a pressure rib provided at the first end wall, wherein the pressure rib is compressed by the step portion of the pipe-shaped connector and hence is plastically deformed.

2. The falling-off prevention structure for a connector according to claim 1, further comprising:

a lid member covering the open surface of the falling-off preventing holder, the lid member being openable and closable, wherein a material of the lid member has a hardness higher than that of a material of the falling-off preventing holder.

3. The falling-off prevention structure for a connector according to claim 2, wherein:

the lid member is pivotally supported by the falling-off preventing holder at one side edge;

a locking claw provided at the other side edge is capable of engaging with a locked portion provided at the falling-off preventing holder; and the lid member is pushed in an opening direction with an elastic force of a press-fitting piece integrally formed at the falling-off preventing holder.

4. The falling-off prevention structure for a connector according to claim 2, wherein the rotation preventing rib provided on the inner surface of the lid member is engaged with a rotation preventing recessed portion provided in the pipe-shaped connector.

5. The falling-off prevention structure for a connector according to claim 4, wherein when torque around an axis of the pipe-shaped connector acts on the pipe-shaped connector, the rotation preventing rib provided on the inner surface of the lid member ruptures to prevent a damage to the pipe-shaped connector.

6. The falling-off prevention structure for a connector according to claim 1, wherein a height of the pressure rib is smaller at the side of the open surface of the falling-off preventing holder where the connector is inserted from, and higher in a taper shape where the pressure rib is closer to a ceiling wall of the falling-off preventing holder.

* * * * *